April 13, 1948.  K. N. MATHES  2,439,667

METHOD OF MAKING LAMINATED ELECTRICAL INSULATING MATERIAL

Filed Sept. 29, 1943

Inventor:
Kenneth N. Mathes,
by Harry E. Dunham
His Attorney.

Patented Apr. 13, 1948

2,439,667

UNITED STATES PATENT OFFICE 2,439,667

METHOD OF MAKING LAMINATED ELECTRICAL INSULATING MATERIAL

Kenneth N. Mathes, Schenectady, N. Y., assignor to General Electric Company, a corporation of New York Application September 29, 1943, Serial No. 504,284

3 Claims. (Cl. 154—2.6)

The present invention relates to the production of laminated electrical insulation material, and more specifically to the production of mechanically strong, heat-, flame-, and arc-resistant laminated electrical insulation which is particularly suitable for use as panel board material.

In accordance with the present invention, laminated products are produced by molding, under heat and pressure, coated and impregnated asbestos fibrous material in sheet form; for example, asbestos paper or woven fabric made from asbestos and glass fibers, preferably associated with a core of molded laminated fibrous material impregnated and coated with a thermosetting synthetic resinous composition, such as phenolic, urea, etc., resin compositions, or a core of treated interwoven asbestos or asbestos-glass fibrous material. The coating and impregnating treatment of the asbestos or asbestos-glass fibrous material includes the use of phosphoric acid compounds decomposable under heat in the presence of asbestos into orthophosphoric acid; for example, such compounds as amonium phosphate, primary aluminum phosphate and the like. In certain cases it is advantageous to include some of the free orthophosphoric acid in the treatment with the phosphoric acid compounds.

For a consideration of what is believed to be novel and the invention, attention is directed to the following specification and claims, together with the accompanying drawing, in which Fig. 1 is a fragmentary perspective view of one form of my invention;

Figure 1:
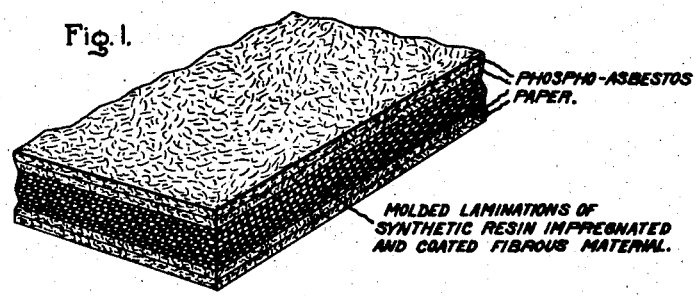

As shown in Fig. 1, one form of the invention comprises a core of molded laminations of synthetic resin impregnated and coated fibrous material faced with sheets or laminations of asbestos paper which have been treated with a phosphoric acid compound, the designation in the drawing "phospho-asbestos" being used to indicate the specific treatment of the asbestos fibers with the phosphoric acid compound as hereinafter described. In producing the form of the invention shown in Fig. 1, asbestos paper in sheet form is first treated with ammonium phosphate or other phosphoric acid compound which decomposes under heat in the presence of the asbestos into phosphoric acid. The requisite number of sheets or laminations to be associated with the core are treated, and while the form shown in Fig. 1 of the drawing illustrates the core faced with two sheets of laminations on each side thereof, it will be understood that any number of sheets or laminations of the treated asbestos paper may be employed, and if desired, only one side of the core may be faced with these treated sheets of asbestos paper. The core may be in the form of the requisite number of already molded laminations of fibrous material, for example, cloth coated and impregnated with a thermosetting synthetic resinous composition, for example, a thermosetting resinous composition of the phenolic, urea, and the like types, or the requisite number of unmolded laminations of fibrous material coated and impregnated with the thermosetting synthetic resinous composition may be used. In either case the core is faced on one or both sides with the sheet or sheets of asbestos paper treated as described above with the phosphoric acid compound, the entire stack being then molded under heat and pressure to produce the final molded laminated product.

Figure 2:
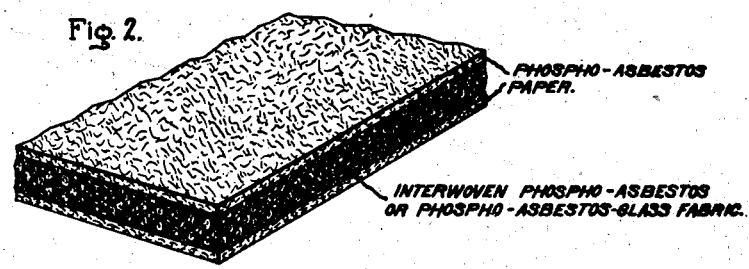
Fig. 2 is a view similar to Fig. 1 of a modified form of the invention.

Fig. 2 illustrates a modification of the structure shown in Fig. 1, the modification consisting of the use of a core of heavy interwoven asbestos or asbestos-glass fabric in place of the core of laminated fibrous material treated with the thermosetting resinous composition. In this case the interwoven core is first coated and impregnated with the phosphoric acid compound and faced with the treated asbestos paper and molded under heat and pressure. This construction presents an entirely inorganic molded laminated material.

Figure 3:
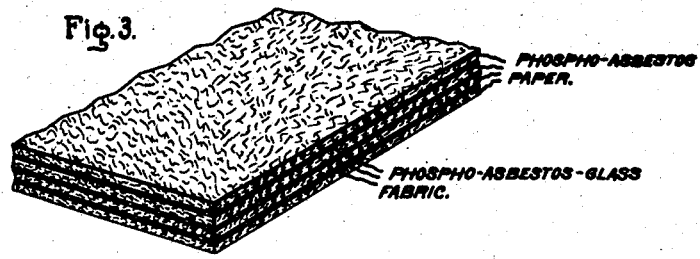
Fig. 3 is a view similar to Fig. 1 showing another modification of the invention.

A still further modification of the invention is illustrated in Fig. 3 which shows a laminated construction produced by first treating asbestos paper sheets and sheets of cloth composed of interwoven fibers of asbestos and glass with the phosphoric acid compound. Alternate layers of the treated asbestos paper and treated asbestos-glass cloth are stacked, the appropriate number of laminations being used to give the desired thickness in the final product. The stacked layers are then molded under heat and pressure, whereupon the layers are bonded together to form a solid, completely inorganic laminated product. In this modification of the invention the core takes the form of alternate layers of asbestos-glass fabric and asbestos paper in place of the core of molded laminations of synthetic resin impregnated and coated fibrous material illustrated in Fig. 1, or the core of interwoven asbestos or asbestos-glass fabric shown in the modification of Fig. 2, the facing sheets in all cases being treated asbestos fibrous material in sheet form, specifically asbestos paper.

It is to be observed that in each case no bonding medium, other than the impregnating and coating agents used in the treatment of the laminations, is necessary in order to effect bonding of the laminations of asbestos paper, either to the core used as in Figs. 1 and 2 or the asbestos-glass fabric used in the construction shown in Fig. 3. The molding operation solidly bonds the laminations and the products are produced without the necessity of utilizing any separate bonding or adhesive agents.

The products of the present invention exhibit excellent mechanical and electrical properties as compared to the prior art molded laminated products of the type used as panel board material, such as products produced from asbestos and Portland cement mixtures. For example, on a 2000 lb. high-shock test, the conventional asbestos-Portland cement material shows a value of 0 lb., while products of the present invention made, for example, according to the form shown in Fig. 1, exhibit a value of 5 lbs. and products made in accordance with the form shown in Fig. 2 show a value of 2 lbs. (The 2000 lb. high-shock test, which was adapted for testing laminated panels to be used on board naval ships, is conducted as follows: A test specimen of the laminated sample is mounted on an anvil which in turn is mounted on a large thick metal plate. Directly to the side of the test specimen furthest from the metal plate is attached a weight starting with 1 lb. The unit is subjected to a single shock of 2000 pounds impinging on the side of the large metal plate furthest from the test specimen. If the test specimen shows no sign of failure, an additional 1 lb. weight is added to the test specimen and the unit is again subjected to the 2000 pound shock. This procedure of adding weights is repeated until the test specimen breaks or shows a crack.) Also, the dielectric strength of the latter form of product, for example, is between 60 and 100 volts per mil. The arc resistance is 120–180 seconds for a 30 mil facing of asbestos paper in the case of the construction shown in Fig. 1, while the construction illustrated in Fig. 3 shows an arc resistance of between 300 and 400 seconds.

In treating the asbestos paper face sheets, a preferred solution is 30 parts by weight of ammonium phosphate dissolved in 100 parts by weight of water, while in the case of the asbestos cloth combination it is desirable to use, in addition to the ammonium phosphate, some phosphoric acid, a preferred solution being 30 parts by weight of ammonium phosphate, 15 parts by weight of orthophosphoric acid (85% concentration) dissolved in 100 parts by weight of water. Ortho-phosphoric acid itself cannot advantageously be used since it attacks the laminations of asbestos paper, producing a pulpy product which is difficult to laminate and upon lamination and molding produces a brittle product. However, a compound such as ammonium phosphate which decomposes under heat in the presence of asbestos to phosphoric acid works satisfactorily even in saturated solution.

In producing the products of the present invention, molding pressures of from about 500 lbs. per sq. in. to about 2000 lbs. per sq. in. and temperatures of from 125° C. to 165° C. may advantageously be used. The time of molding is, as will be understood, related to the temperature, pressure and thickness of material being molded; for example, in molding a piece ¼ inch thick at a pressure of 1000 lbs. per sq. in., and a temperature of 160° C., one hour is required to complete the molding of the piece.

What I claim as new and desire to secure by Letters Patent of the United States is:

1. The method of making a laminated electrical insulation panel having a dielectric strength of at least 60 volts per mil and a 2,000 lb. high-shock test of at least 5 lbs., which method comprises (1) forming a core of laminations of sheets of cloth impregnated and coated with a thermosetting phenolic resin, (2) applying to both sides of said core face sheets of asbestos sheet material coated and impregnated with an ortho-phosphoric acid compound decomposable under heat in the presence of asbestos to ortho-phosphoric acid, and (3) molding the assembly obtained in (2) under pressure and at a temperature of from about 125° to 165° C. to unite the laminations of said core to each other and to the face sheets.

2. The method of making a laminated electrical insulation panel having an arc resistance of at least 120 seconds and a 2,000 lb. high-shock test, which method comprises (1) forming a core of laminations of sheets of cloth impregnated and coated with a thermosetting phenolic resin, (2) applying to both sides of said core face sheets of asbestos sheet material coated and impregnated with ammonium orthophosphate, and (3) molding the assembly obtained in (2) under pressure and at a temperature of from about 125° to 165° C. thereby uniting the laminations of said core to each other and to the face sheets.

3. The method of making a laminated electrical insulation panel having a 2,000 lb. high-shock test of at least 5 lbs., a dielectric strength of at least 60 volts per mil, and an arc resistance of at least from 120 to 180 seconds, which method comprises (1) forming a core of laminations of sheets of cloth impregnated and coated with a thermosetting phenolic resin, (2) applying to both sides of said core, in a thickness of at least 30 mils, face sheets of asbestos sheet material coated and impregnated with an aqueous solution comprising, by weight, about 30 parts of ammonium ortho-phosphate dissolved in 100 parts water, and (3) molding the assembly obtained in (2) at a temperature of from about 125° to 165° C. and at a molding pressure of from about 500 to 2,000 lbs. p. s. i., thereby to unite the laminations of said core to each other and to the face sheets.

KENNETH N. MATHES.

REFERENCES CITED

The following references are of record in the file of this patent:

UNITED STATES PATENTS

| Number | Name | Date |
|---|---|---|
| 1,427,911 | Richardson | Sept. 5, 1922 |
| 1,501,895 | Andrews et al. | July 22, 1924 |
| 1,730,586 | Mills | Oct. 8, 1929 |
| 1,962,577 | Wolochow | June 12, 1934 |
| 1,975,081 | Boughton | Oct. 2, 1934 |
| 2,196,974 | Boughton et al. | Apr. 16, 1940 |